(12) United States Patent
Rowles et al.

(10) Patent No.: US 7,873,877 B2
(45) Date of Patent: Jan. 18, 2011

(54) SYSTEM AND METHOD FOR PERFORMANCE MONITORING AND REPAIR OF COMPUTERS

(75) Inventors: Noah Tilman Rowles, Pasadena, CA (US); Daniel Harlan Hawks, University City, MO (US)

(73) Assignee: iolo technologies, LLC, Los Angeles, CA (US)

( * ) Notice: Subject to any disclaimer, the term of this patent is extended or adjusted under 35 U.S.C. 154(b) by 461 days.

(21) Appl. No.: 11/998,629

(22) Filed: Nov. 30, 2007

(65) Prior Publication Data

US 2009/0144584 A1 Jun. 4, 2009

(51) Int. Cl.
*G06F 11/00* (2006.01)
(52) U.S. Cl. ....................................................... 714/47
(58) Field of Classification Search .................... 714/47
See application file for complete search history.

(56) References Cited

U.S. PATENT DOCUMENTS

| 7,136,778 B2* | 11/2006 | Duron et al. ............. 702/182 |
|---|---|---|
| 7,194,645 B2* | 3/2007 | Bieswanger et al. ........ 713/320 |
| 7,421,592 B1* | 9/2008 | Kadatch et al. ............. 713/300 |
| 7,484,132 B2* | 1/2009 | Garbow ....................... 714/47 |
| 2005/0120256 A1* | 6/2005 | Lu ............................. 713/324 |
| 2006/0190938 A1* | 8/2006 | Capek et al. ................. 717/161 |
| 2006/0248410 A1* | 11/2006 | Circello et al. ................ 714/47 |
| 2009/0083586 A1* | 3/2009 | Warner et al. ................. 714/47 |
| 2009/0319835 A1* | 12/2009 | Teranishi ..................... 714/45 |

* cited by examiner

*Primary Examiner*—Bryce P Bonzo
(74) *Attorney, Agent, or Firm*—Reed Smith LLP

(57) ABSTRACT

A system and method for monitoring computer performance and repairing and/or optimizing system configurations. During these idle times, the present process executes a sequence of background system analyses that can trigger associated optimization, maintenance, or repair actions based on a comparison of current computer states and baseline optimal health data. If other tasks are initiated by a user of the system, while the present invention is performing any of its actions, the monitoring and repair program terminates itself and releases full control back to the user and operating system.

24 Claims, 14 Drawing Sheets

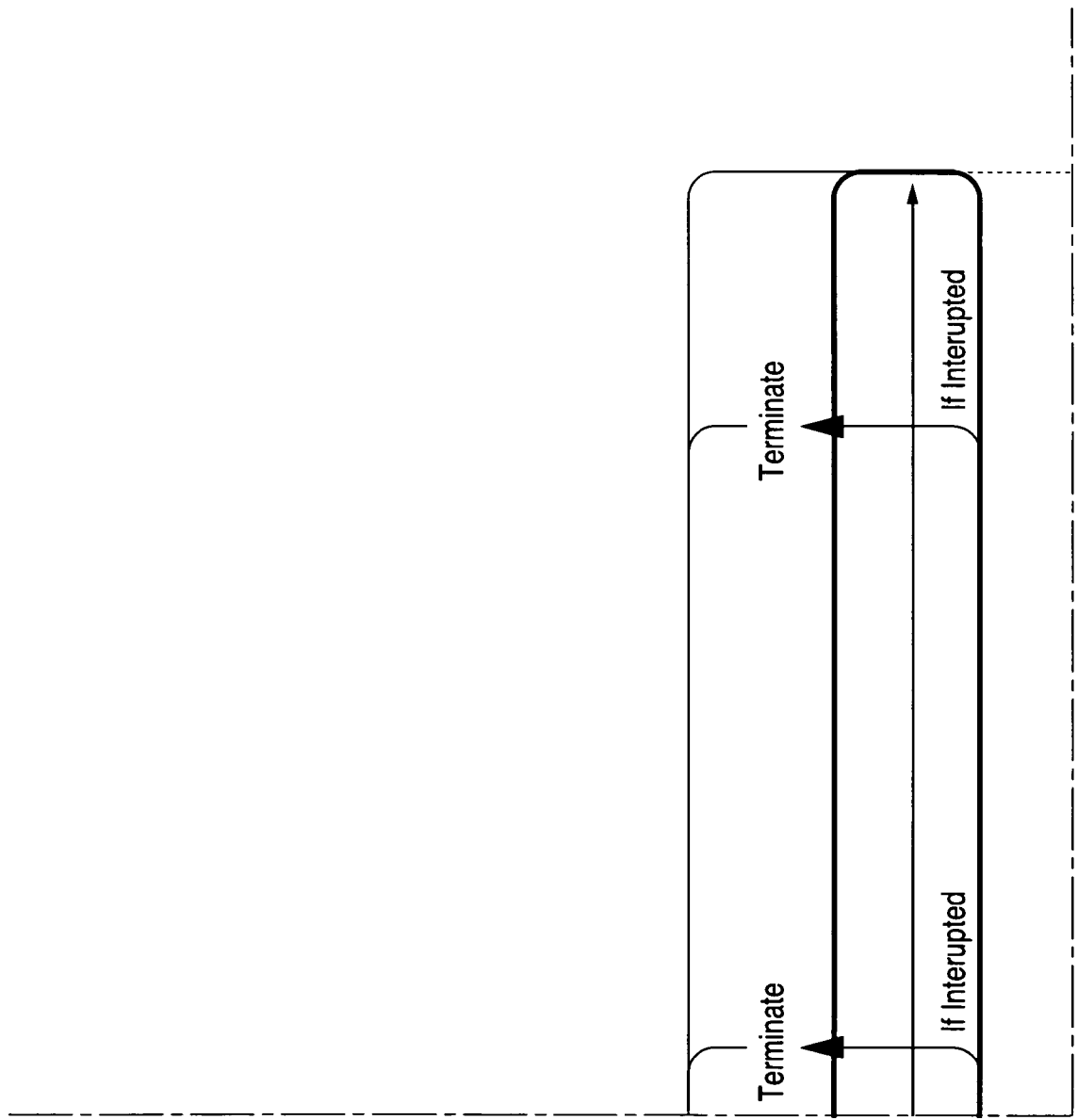

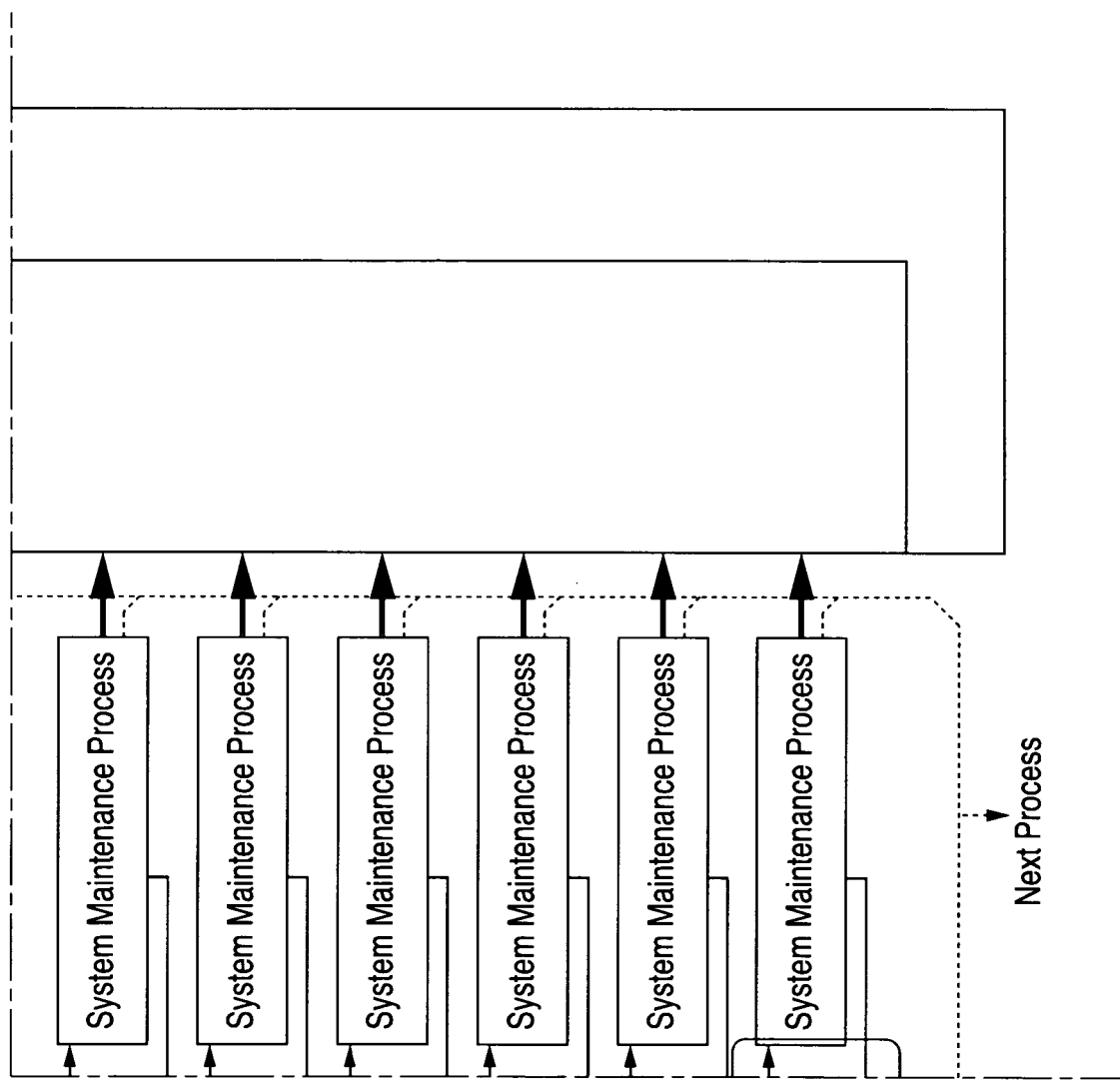

| Maintenance Category | Metric Measured | Trigger Threshold | Resulting Action |
|---|---|---|---|
| Clutter | Overall System Clutter | 25 MB or more system clutter detected | Clutter removed |
| Security | Software Parasites | 1 or more parasites detected | Parasites removed |
| | Security Vulnerabilities | 5 or more vulnerabilities detected | Vulnerabilities repaired |
| | System Registry Backup | Registry has not been backed up for 26 days or more | Backup performed |
| Fitness | Invalid Uninstallers | 4 or more invalid uninstallers detected | Invalid uninstallers removed |
| | System Registry Problems | 6 or more problems detected | Problems repaired |
| | Hard Drive Problems | 1 or more problems detected | Problems repaired |
| | Broken Shortcuts | 21 or more broken shortcuts detected | Problems repaired |
| Speed | Hard Drive Fragmentation | Hard drive fragmentation quotient exceeds 8% | Hard drive defragmented |
| | Physical Memory Fragmentation | Available physical memory is 50% or less | Physical memory is defragmented and recovered |
| | System Registry Fragmentation | Registry has not been defragmented for 26 days or more | Registry defragmented |
| | Network Optimization | Network or internet settings not optimal | Settings optimized |
| | Startup Bottlenecks | 3 or more startup bottlenecks detected | Bottlenecks resolved |

FIG. 4

SYSTEM AND METHOD FOR PERFORMANCE MONITORING AND REPAIR OF COMPUTERS

BACKGROUND OF THE INVENTION

1. Field of the Invention

The present invention relates generally to performance monitoring of computers, and more particularly, to a system and method for performance monitoring and repair of various operating conditions for computers.

2. Description of the Related Art

In an effort to keep computers, such as personal computers (PCs), operating at peak performance and to resolve system problems, users normally need to take time away from their work and run utility software to diagnose and improve machine performance. Normally, this process takes place manually whenever the computer appears to be suffering from performance loss, faulty settings, or unexpected errors. Initially, users often run this type of utility software manually whenever the computer performance seems slow. Then, typically, users create a proactive policy to perform a system scan once a month, or once a week.

Some computer utility software manufacturers have attempted to automate the computer maintenance process by allowing users to set up specific scheduled operations that take place automatically at certain intervals, such as once a week, or every few days. However, there are several problems with this approach:

First, the maintenance and repair operations take place at their scheduled times whether or not they are actually needed or will result in any perceptible benefit.

Second, because the operations only take place on a set interval, problems that occur in between these intervals will exist until the next scheduled maintenance action takes place, which could be days or weeks later.

Third, the scheduled operations take place whether or not the computer is being used to perform other tasks at the scheduled maintenance time. Due to their intensive CPU requirements, however, this can interrupt or dramatically slow down the system, especially when the user is performing other work on the computer.

Ideally, computer users expect peak performance at all times, without the need to perform manual intervention or monitoring of the computer performance, and without the annoyance of periodic scheduled maintenance, which could interfere with normal user tasks.

SUMMARY OF THE INVENTION

In general, the present invention provides a system and method for monitoring computer performance and repairing detected defects and/or optimizing system performance. The system and method of the present invention provide constant peak computer performance transparently to the user, without impacting computer performance while the operating system is idle. During these idle times, the present invention executes a sequence of background system analyses that can trigger associated optimization, maintenance, or repair actions based on a comparison of current computer states and baseline optimal health data. If other tasks are initiated by a user of the system, while the present invention is performing any of its actions (i.e. the computer becomes "un-idle"), the monitoring and repair program gracefully terminates itself and releases full control back to the user and operating system.

More particularly, a method according to the present invention for monitoring computer system performance comprises reading a subset of computer system variables (operating system variables or other variables associated with computer performance, such as hardware and/or memory variables) that indicate a status and/or state of a first performance condition; analyzing the subset of computer system variables; storing a result of the analysis of the subset of computer system variables in a memory, wherein the result of the analysis can be shared with other processes; and comparing the result of the analysis against at least one pre-determined baseline optimal threshold; wherein if the comparing shows that a current performance is greater than the at least one pre-determined threshold, a next system analysis process is invoked; otherwise if the comparing shows that the performance is less than the at least one pre-determined threshold, an action trigger is generated. The action trigger is then filtered against a user configuration setting. If the action trigger matches a current user configuration setting, a repair process is invoked. Otherwise, if the action trigger does not match a current user configuration setting, a next system analysis process is invoked.

A method for maintaining computer performance while a computer operating system is in an idle state, comprising reading a subset of computer system variables that indicate a status and/or state of a first performance condition; analyzing the subset of computer system variables; storing a result of the analysis of the subset of computer system variables in a memory, wherein the result of the analysis can be shared with other processes; and comparing the result of the analysis against at least one pre-determined baseline optimal threshold; wherein if the comparing shows that a current performance is greater than the at least one pre-determined threshold, a next system analysis process is invoked; otherwise if the comparing shows that the performance is less than the at least one pre-determined threshold, a corrective repair process is invoked; and exiting the maintenance process or a corrective repair process when the operating system is no longer in an idle state.

A system for monitoring computer performance and repairing system defects according to the present invention comprises a processing unit; and a memory storing a program of instructions; wherein the program of instructions implements a method for monitoring computer performance and repairing defects, the program of instructions including instructions for performing the steps of: detecting an idle state of an operating system; when an idle state is detected, performing the steps of: reading a subset of computer system variables that indicate a status and/or state of a first performance condition; analyzing the subset of computer system variables; storing a result of the analysis of the subset of computer system variables in a memory, wherein the result of the analysis can be shared with other processes; and comparing the result of the analysis against at least one pre-determined baseline optimal threshold; wherein if the comparing shows that a current performance is greater than the at least one pre-determined threshold, a next system analysis process is invoked; otherwise if the comparing shows that the performance is less than the at least one pre-determined threshold, a corrective repair process is invoked; and exiting the program of instructions for monitoring and/or repairing when the operating system is no longer in an idle state.

The present invention may also be embodied in a computer readable medium including computer program code for monitoring computer performance, said computer readable medium comprising: computer program code for reading a subset of computer system variables that indicate a status and/or state of a first performance condition; computer program code for analyzing the subset of computer system variables; computer program code for storing a result of the analysis of the subset of computer system variables in a memory, wherein the result of the analysis can be shared with other processes; and computer program code for comparing the result of the analysis against at least one pre-determined baseline optimal threshold; wherein if the comparing shows that a current performance is greater than the at least one pre-determined threshold, computer program code for a next system analysis process is executed; otherwise if the comparing shows that the performance is less than the at least one pre-determined threshold, computer program code for generating an action trigger is executed.

BRIEF DESCRIPTION OF THE DRAWINGS

The present invention will be readily understood by the following detailed description in conjunction with the accompanying drawings, in which:

FIG. 4 is a chart showing examples of optimal baseline values for various computer performance values, according to one embodiment of the invention.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, the system and method of the present invention provide constant peak computer performance transparently to the user, without impacting computer performance by working in real time while the operating system is idle (i.e. not being used for other tasks). During these idle times, the present invention executes a sequence of background system analyses that can trigger associated optimization, maintenance, or repair actions based on a comparison of current computer states and baseline optimal health data. If other tasks are initiated by a user of the system, while the present invention is performing any of its actions (i.e. the computer becomes "un-idle"), the monitoring and repair program gracefully terminates itself and releases full control back to the user and operating system.

According to the present invention, users can specify a number of optimization, maintenance, or repair actions that can be immediately triggered and automatically and transparently executed when its ongoing background idle-time analysis determines these actions to be beneficial or necessary. This ensures 100% efficiency (an action is never performed unless it will benefit the computer at that time) and the also ensures the absolute fastest response time to system problems, essentially reacting to and resolving them as they manifest.

Figure 1:
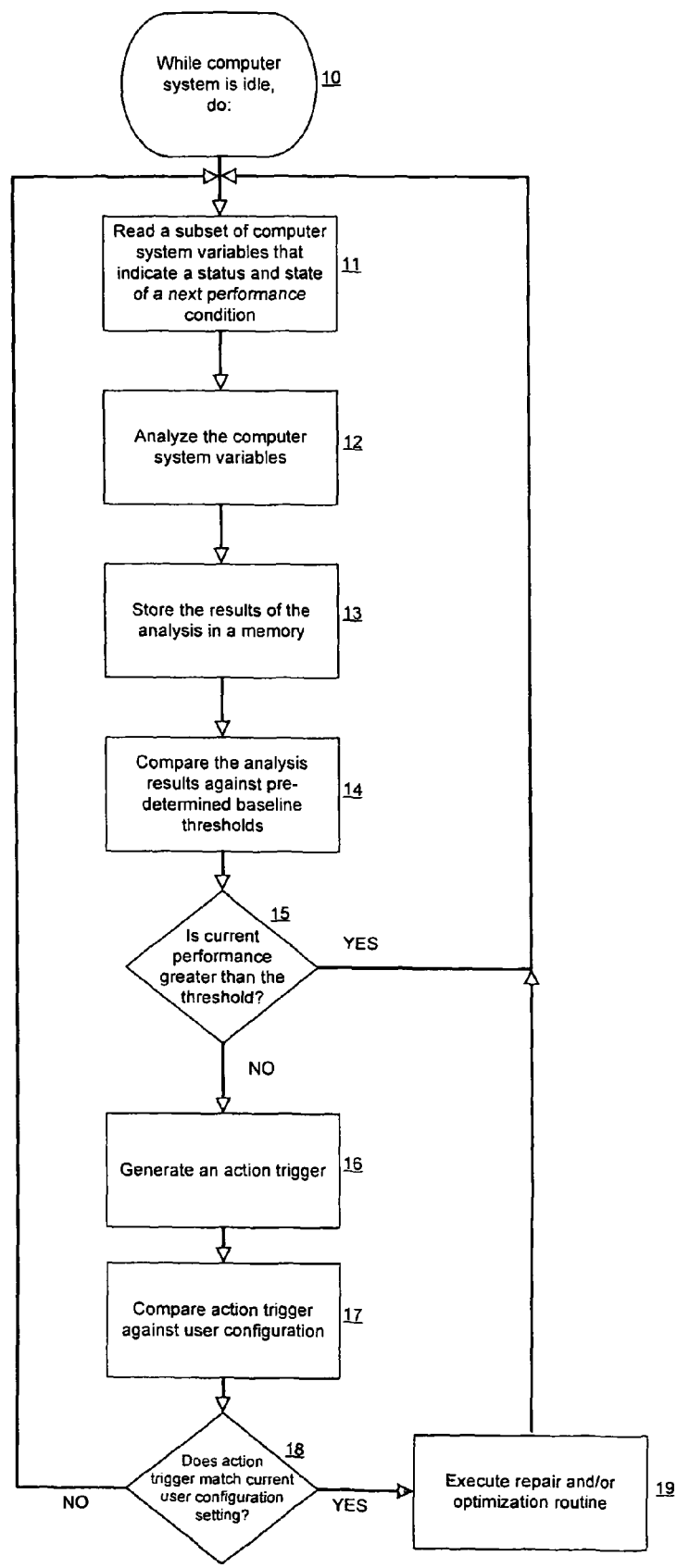
FIG. 1 is a flow chart of an embodiment of the basic process steps according to one embodiment of the present invention.

More particularly, the present invention may provide many different analysis and repair processes to monitor and repair different aspects of a computer's operating condition. In one embodiment, each process, while the operating system is idle (step 10) may perform the steps of (See FIG. 1):

1. Reading a subset of computer system variables that indicate a status and state of a certain performance condition (step 11). These variables may comprise operating system variables maintained by the operating system during normal operation and other system parameters on the condition of various hardware components.
2. Analyzing the computer system variables (step 12)
3. Storing the results of the analysis in a memory where the analysis results can be shared with other processes (step 13)
4. Comparing the analysis results against pre-determined baseline optimal health thresholds (step 14)
    If the analysis shows that current performance is greater than the threshold or desired performance, the process for the next analysis and repair is invoked (step 15)
    If the analysis shows that the performance is less than the threshold or desired performance, a "action trigger" is generated (steps 15, 16)
        Action triggers are filtered against user configurations (step 17)
            If the action trigger matches current user configuration settings, a specific and relevant system performance maintenance process is invoked. (steps 18, 19)
            If the action trigger does not match the current user configuration settings, the process for the next analysis and repair is invoked (step 18)
5. Each time the operating system becomes idle, and the present invention is invoked (or once all the analyses in the collection have been run), the analyses are then run again in sequence starting with the first one. (repeat loop)

Once a repair or optimization has been made to the system, the resulting changes in computer system status and state are considered within subsequent analysis. Once a performance improvement has been noted by an analysis, the analysis of the improved performance will keep the performance maintenance process from being run again for a period of time. This means that the present invention can quickly move through previously performed repairs or optimizations to focus on the areas where performance can be more immediately gained.

The performance thresholds that are used to determine if a repair or optimization should be triggered are the result of accepted performance standards. Many such standards are available from industry sources and/or can be determined by experimenting with settings based on a particular computer's hardware configuration and operating system (see FIG. 4).

Figure 2A:
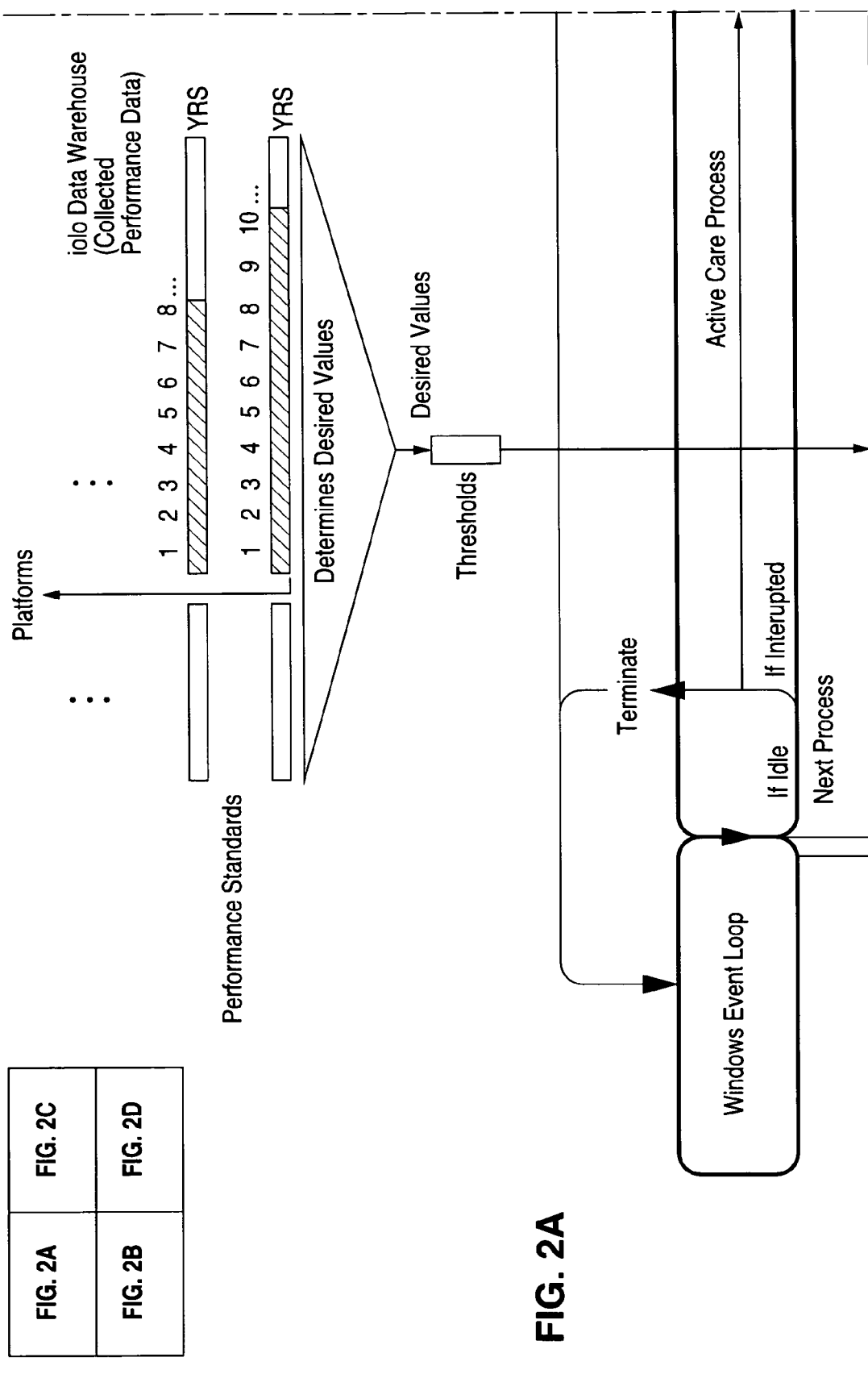
FIG. 2 is block diagram illustrating the event loops in an embodiment of the present invention.
Figure 2B:
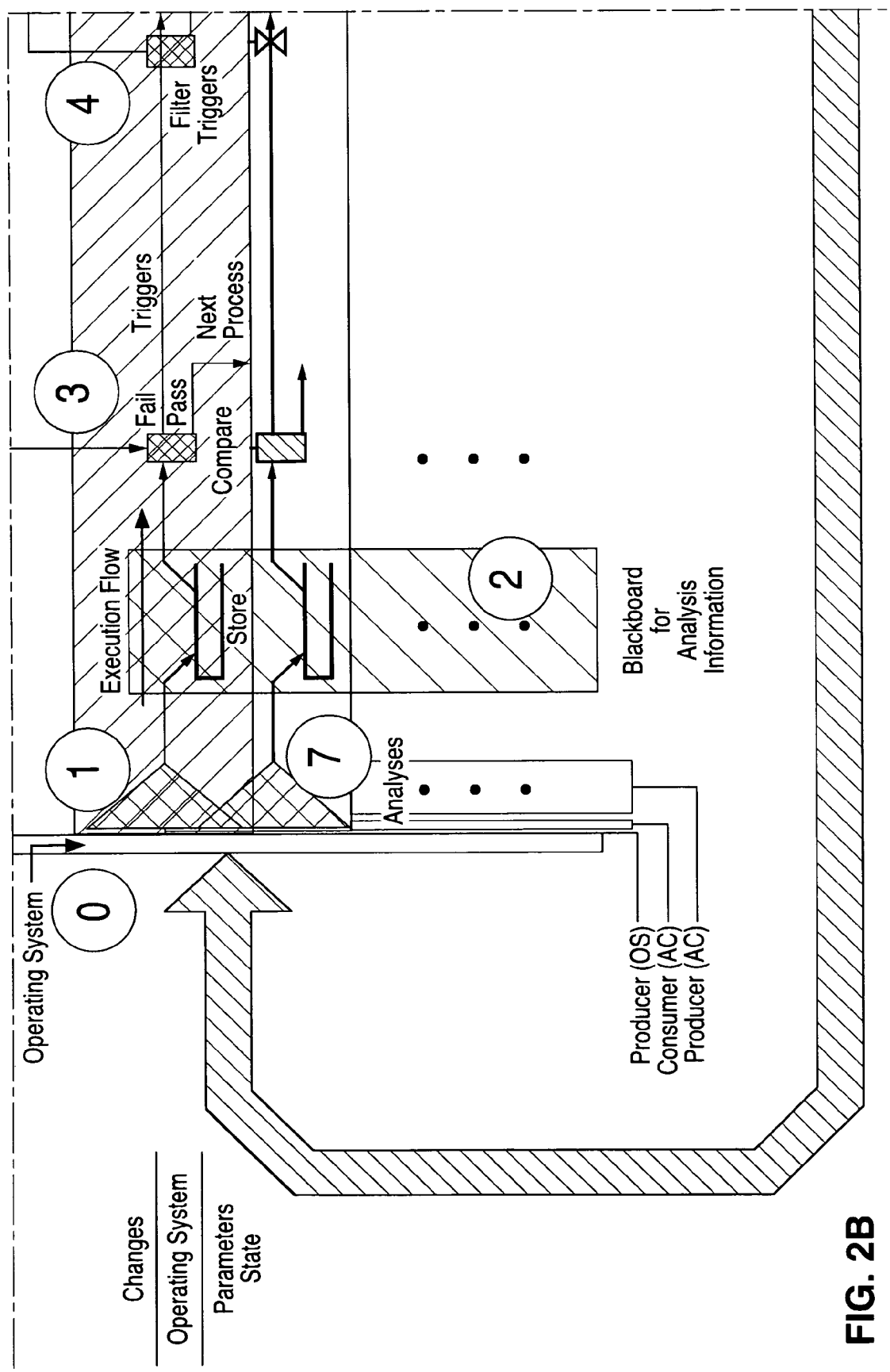
Figure 2D:
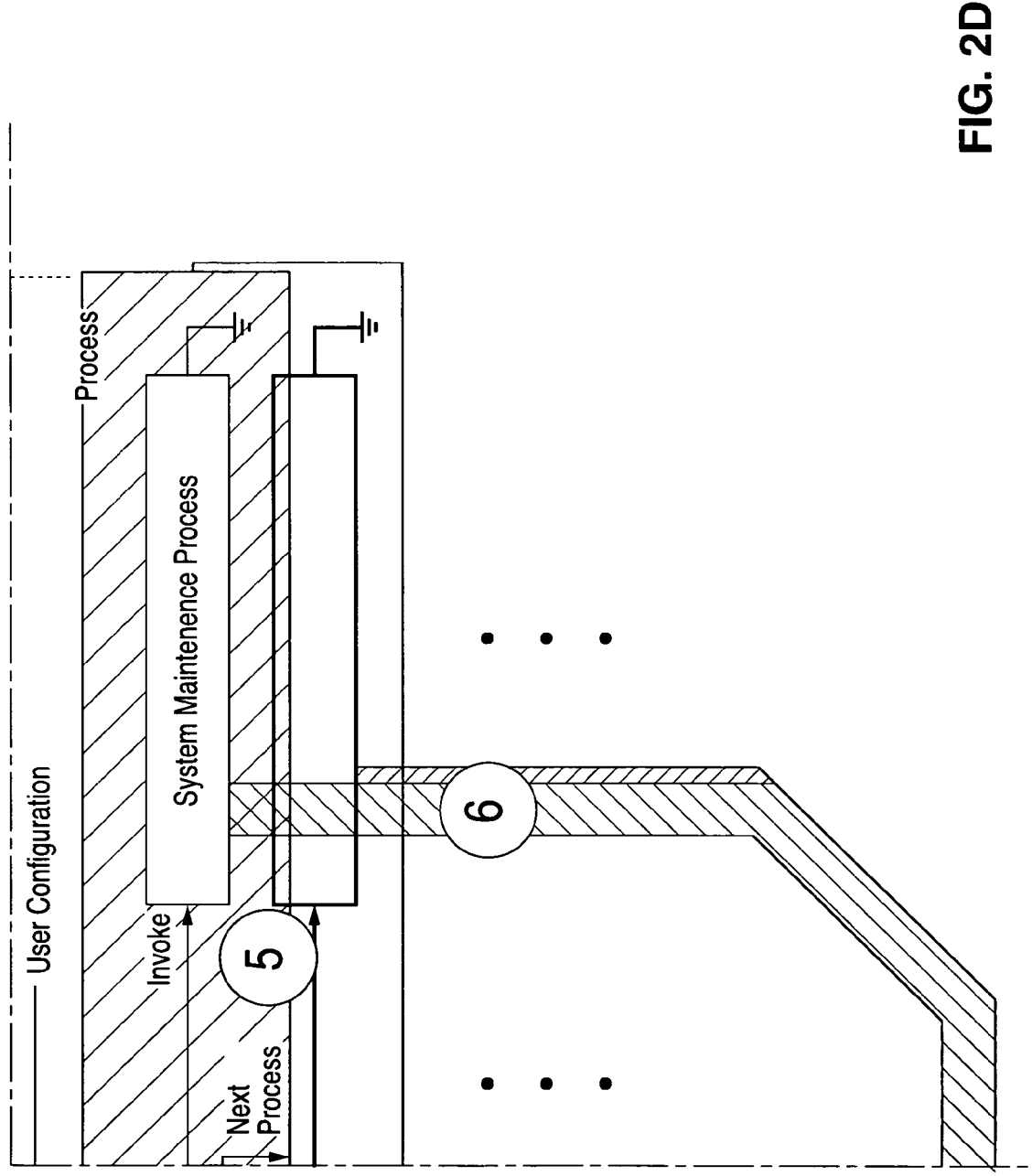
Figure 3A:
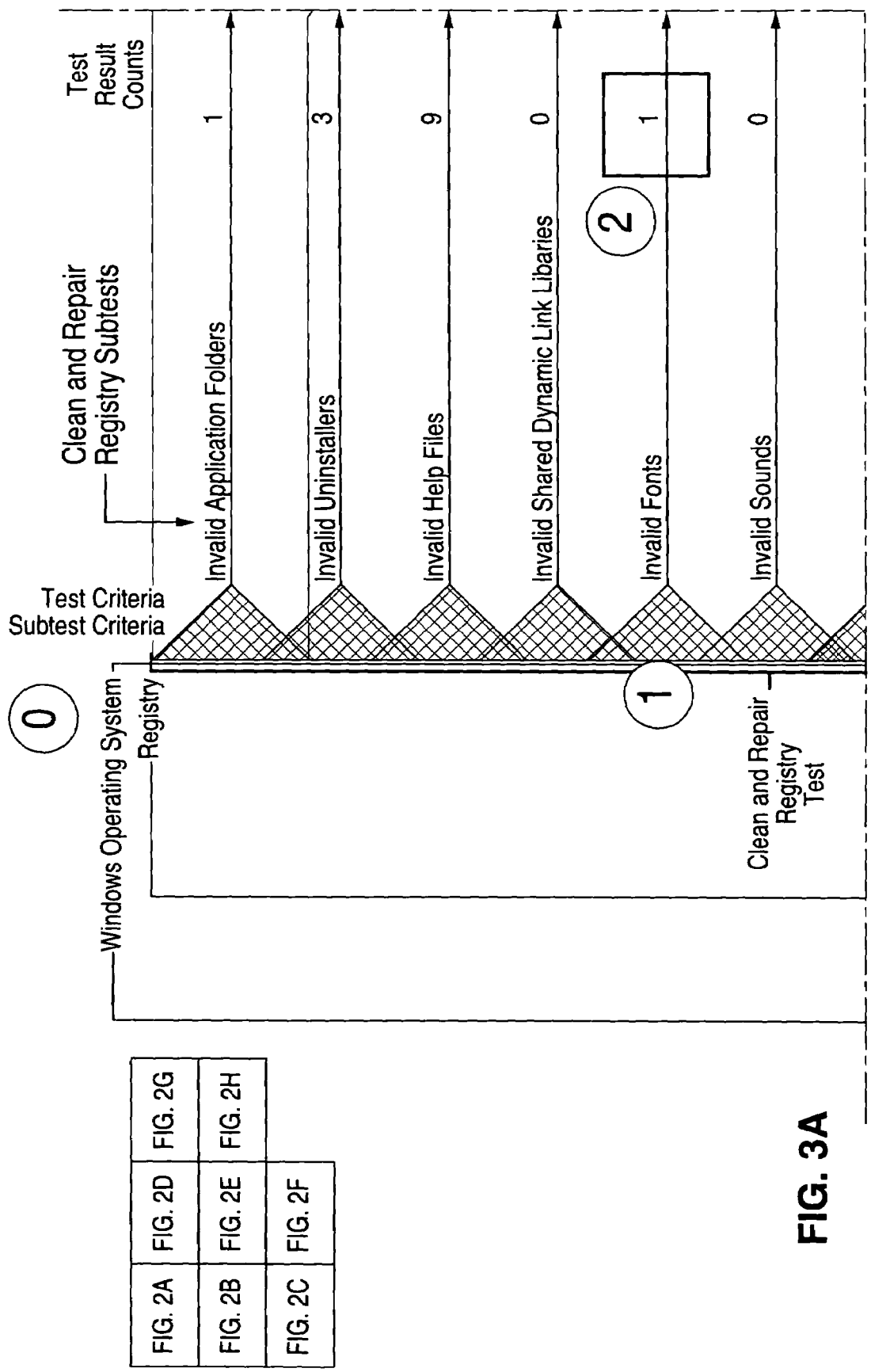
FIG. 3 is a block diagram of an example Invalid Fonts subtest running as part of a main Registry Maintenance test, according to a specific embodiment of the present invention.
Figure 3B:
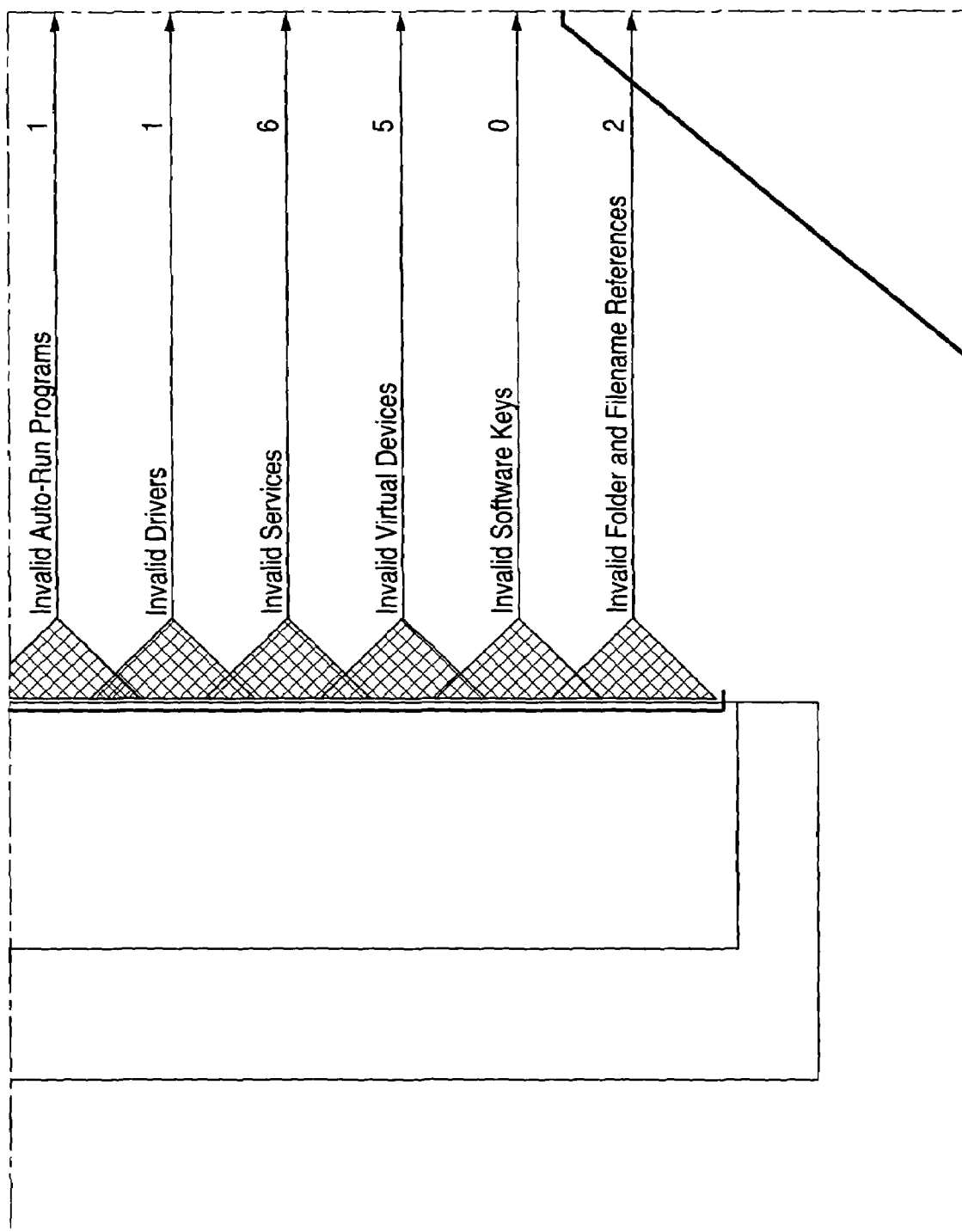
Figure 3C:
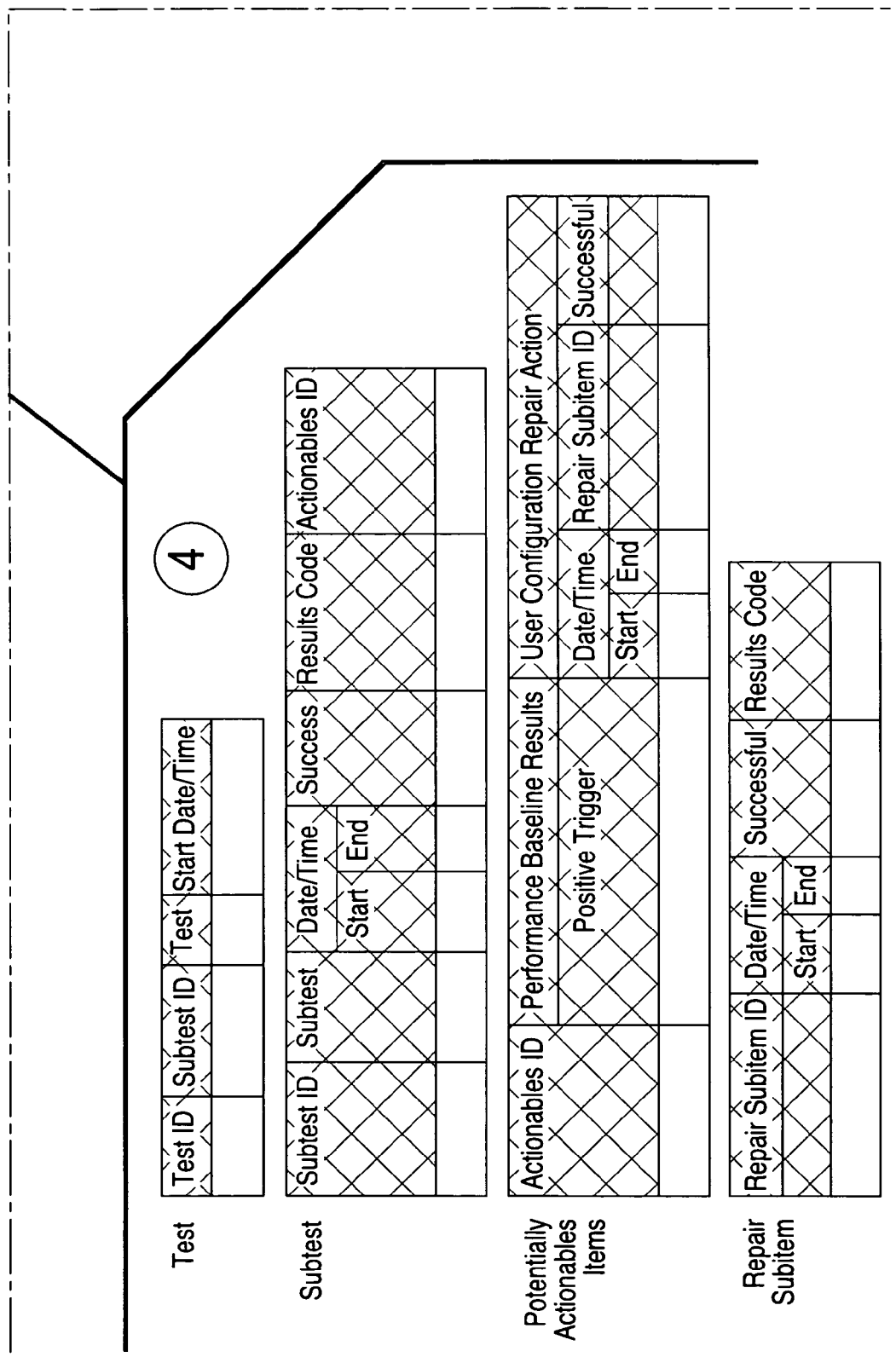
Figure 3D:
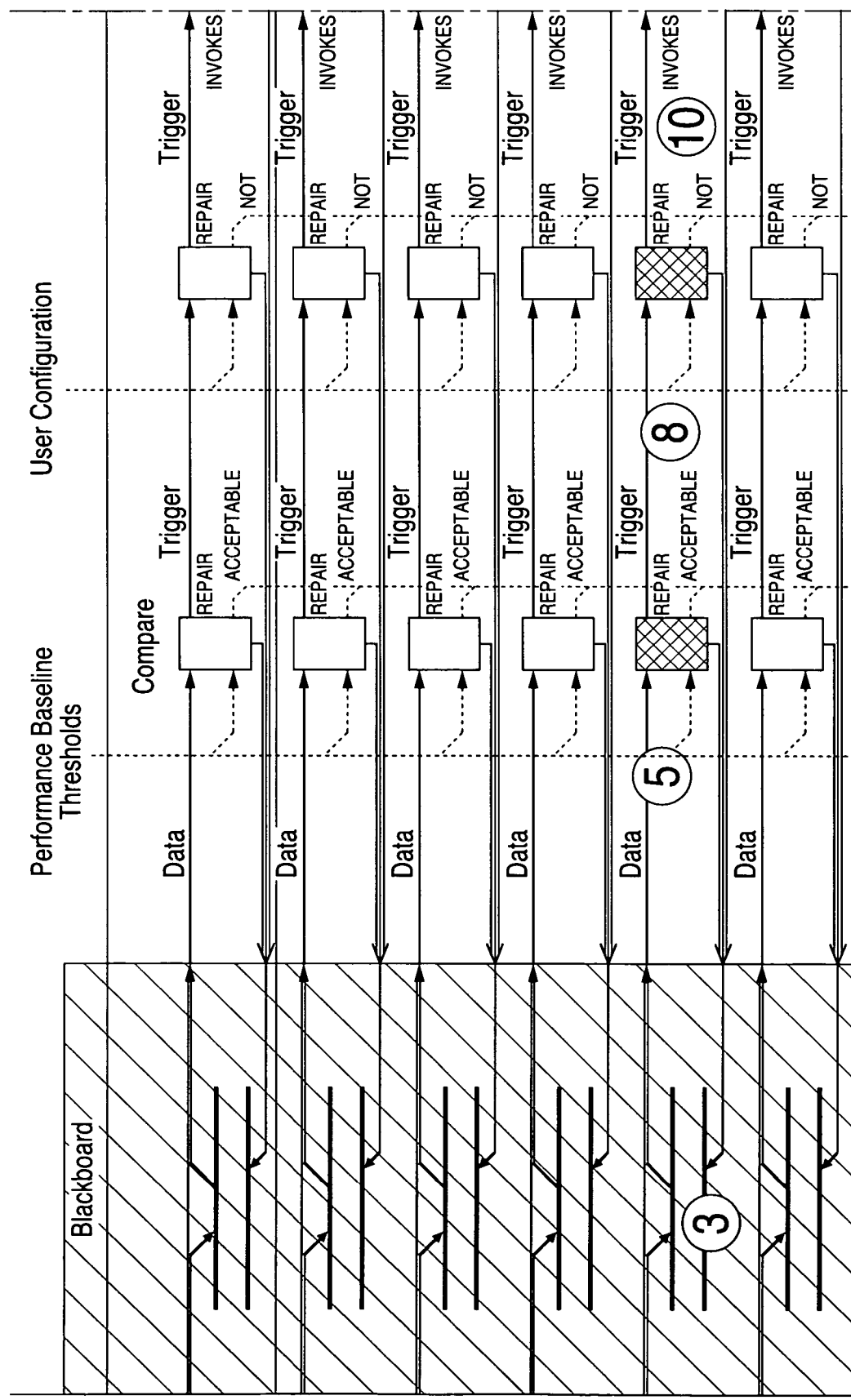
Figure 3E:
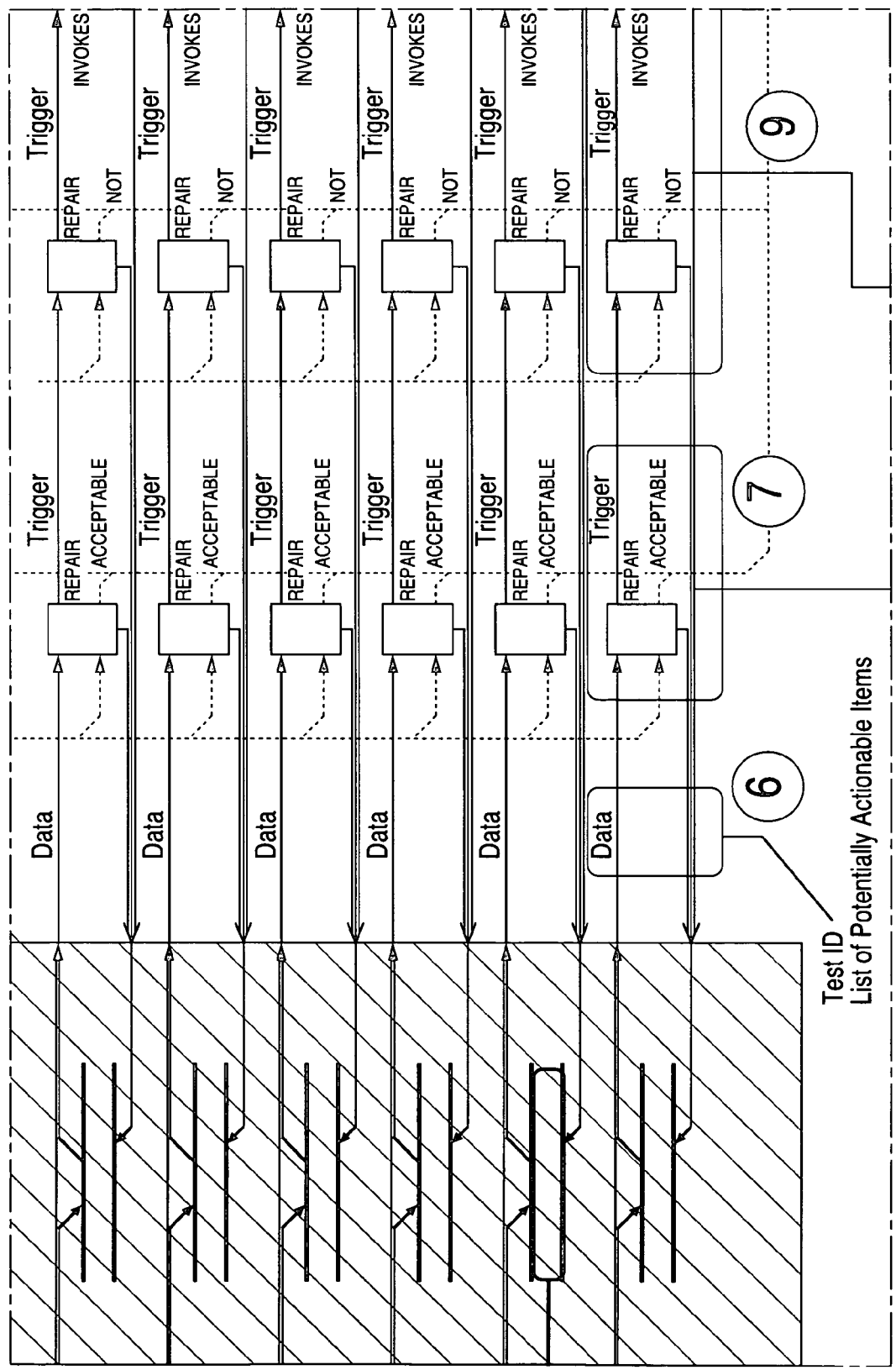
Figure 3F:
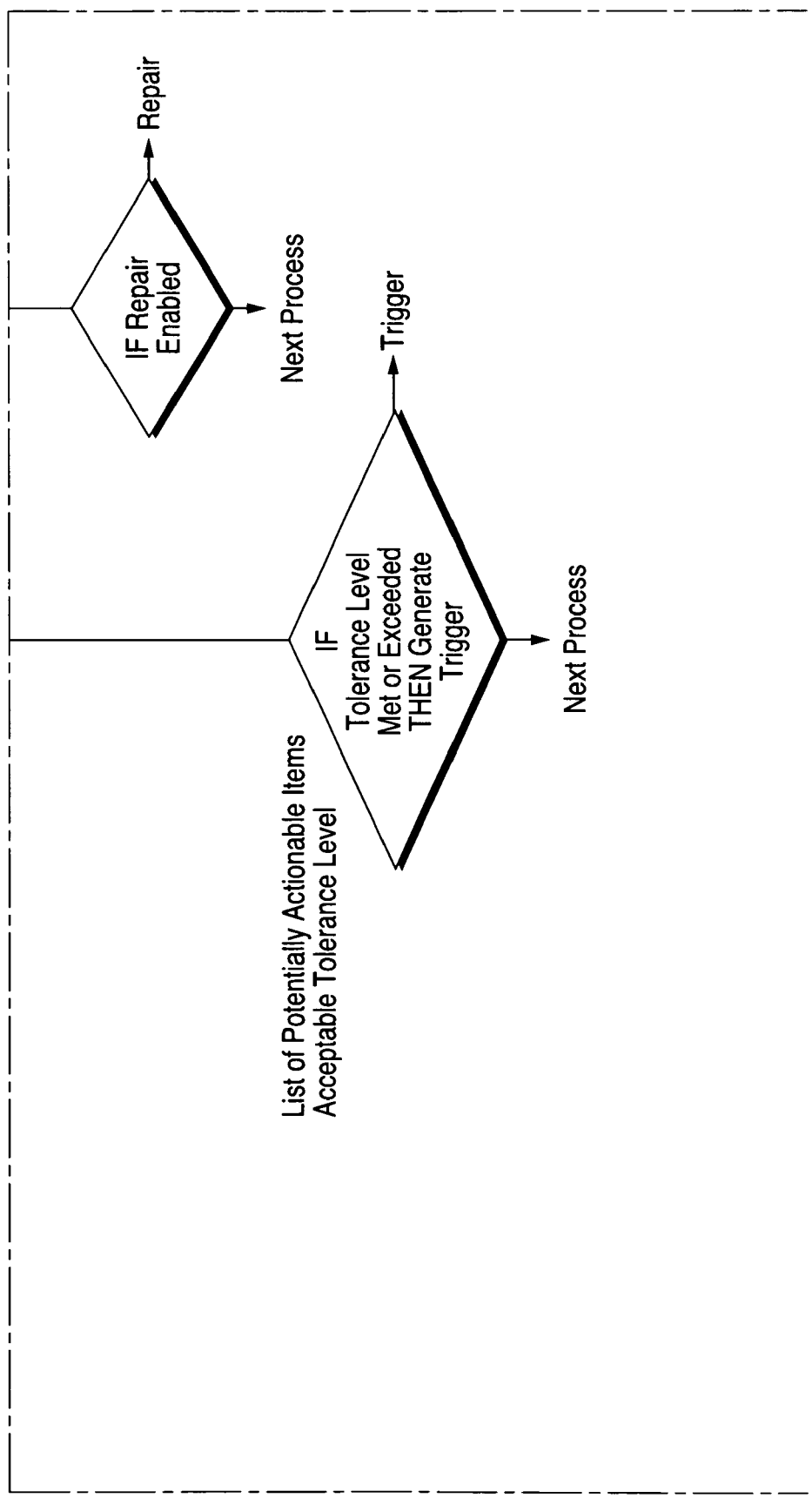
Figure 3G:
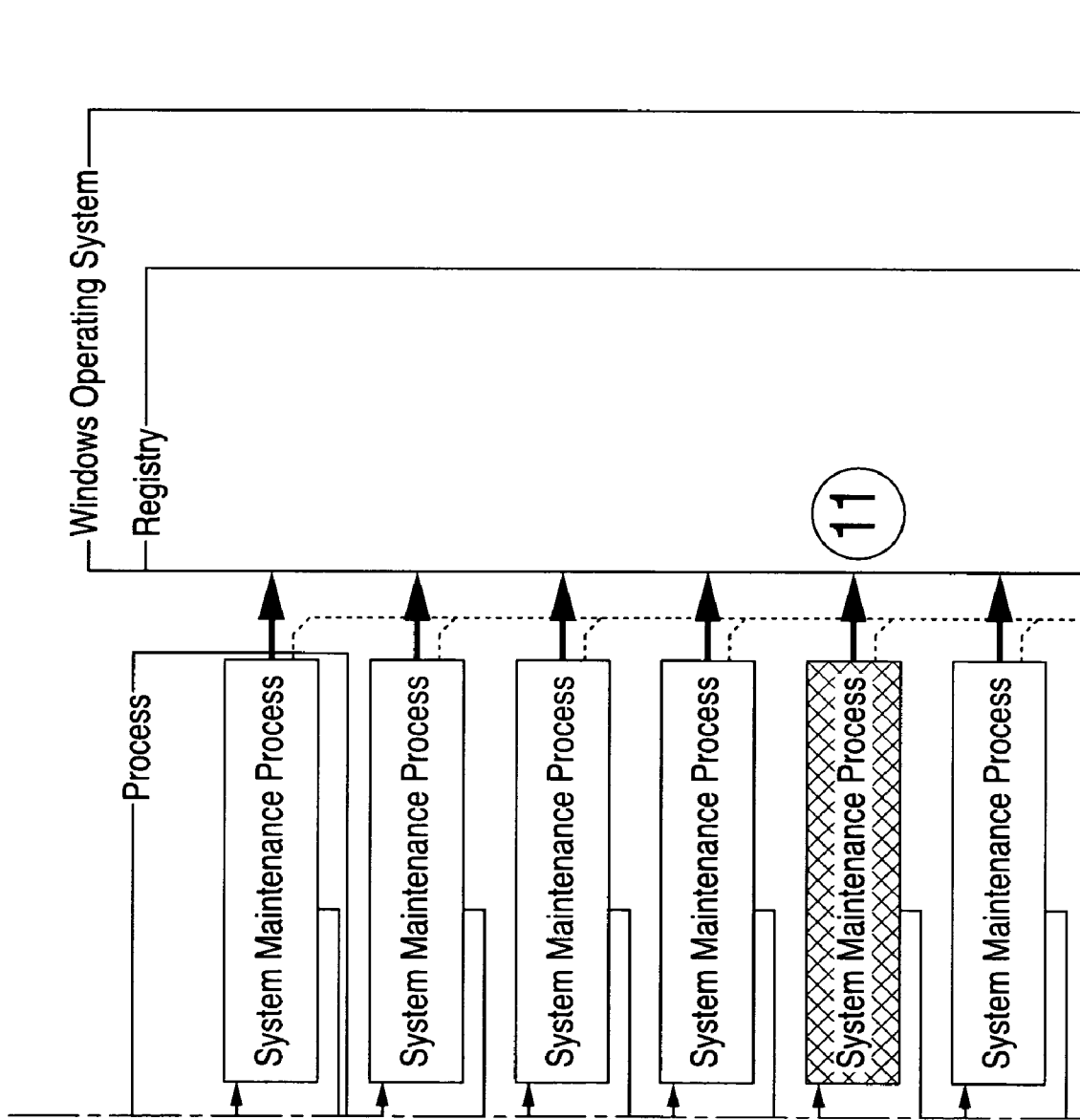

FIG. 2 illustrates a typical analysis and repair process in further detail. Each analysis and repair process focuses on a single category of potential problems. Each analysis and potentially ensuing repair process is run exclusively through completion. Once completed, the next analysis and repair process is invoked. If the idle-state is lost while an analysis and repair process is run, that analysis and repair process is immediately terminated. Once idle-state is regained, the entire analysis-repair process is restarted from its beginning.

As shown in FIG. 2, each analysis and repair process begins at the operating system (0) where computer system variables indicating the status and state of the computer are read. The specific variables read depend on the category of problems addressed by the particular analysis and repair process being run. Once read, the values of these variables are fed into a specific analysis engine (1) that summarizes the variables. The summary values are written into a blackboard (memory) (2) for later use. These summary values are also compared against threshold values (3) indicative of peak or desired performance. If the actual performance is less than that of the threshold values (the desired performance), a trigger is generated.

Each action trigger is tested against user configuration data (4). The configuration data determines if a repair is to be made. For example, if the user has agreed that a problem of the type indicated by the action trigger should be repaired, a system maintenance process (5) is run to correct the problem. Once the system maintenance process has been invoked and run in its entirety, the operating system reflects the changes made by the system maintenance process in its newly updated status and update variables (6), and the next analysis and repair process (7) is invoked.

In the case where performance meets or exceeds the desired performance, or where the user has decided that a repair should not be made, the next analysis and repair process (7) is invoked.

The timing loop shown in FIG. 2 above the first analysis and repair process illustrates what happens as the operating system becomes idle and later when it becomes busy. When the operating system become idle, the analysis and repair processes are run sequentially one at a time, each through to their own completion or until they invoke the next process. When the operating system becomes busy, the executing analysis and repair process ends with a termination. If the analysis and repair process had triggered a system maintenance process, that system maintenance process is likewise terminated. Control is returned to the operating system until the operating system is again idle.

The thresholds (3) for each operating system and computer platform have been determined over the years by analysis of empirical performance data, and by various universally accepted public standards that define peak performance in various ways. If the current performance exceeds the threshold, then no repair is needed, so the next analysis and repair process is invoked. If the current performance is below the threshold or desired performance, a trigger is sent to invoke the system maintenance process associated with the analysis and repair process. The trigger if filtered before the system maintenance process is invoked.

Examples of the types of parameters to be monitored and their respective thresholds are shown in FIG. 4. These are merely examples, and specific computer hardware and software configurations may require different settings, fewer settings, and/or additional settings. Also, as operating systems and hardware platforms evolve, the parameters and thresholds may change as well.

Users can configure what classes of repair or system maintenance processes are run. Each trigger generated by an analysis and repair process is filtered (4) against the user configuration data. If the user wants the deficits of the type associated with the trigger to be performed, the system maintenance process is then invoked. This allows the user to have some control over which repair operations are automatically performed.

A specific embodiment of one process of the present invention is illustrated in FIG. 3. Note that this example is illustrative only, and is not a limitation on the scope of the present invention. Many other monitoring and repair processes can be utilized according to the present invention. Also, this specific embodiment is described using a personal computer (PC) running the Microsoft Windows® operating system. The present invention can also be advantageously applied to other hardware platforms and operating systems. Specifically, this example outlines an Invalid Fonts subtest that is performed as part of a main Registry Maintenance test for the Microsoft Windows® operating system.

The following list outlines the process. The step numbers are associated with the numbered callouts in FIG. 3.

0. The main Registry Maintenance test runs as one of the many possible processes that the present invention invokes as it analyzes Windows, while a computer and the operating system are idle. All tests and subtests store computer system variables and state values (0).
1. The main Registry Maintenance test reads the operating system and registry information and state values as it works sequentially through each of its subtests (1). The subtests that ran prior to the Invalid Fonts subtest have built up the prior data collected on the blackboard.
2. In analyzing the registry, an invalid font was found (2). Notice that one defect was found. This is a positive-valued test result.
3. The positive-valued test results of the Invalid Fonts analysis are written into the blackboard (3). The details about the defect found in step 2 are also saved in the blackboard.
4. The blackboard data is organized as shown in (4). The data retained includes information about the test, its subtests, potentially actionable items, repair sub items and the status flags and status codes for the entire main Registry Maintenance process.
5. Once the positive-valued test results are written to the blackboard, a subset of that data is sent, as a message, for comparison with the performance baseline thresholds associated with the subtest, which here is the Invalid Fonts subtest (5).
6. The message consists of (6) the Test ID and list of potential actionable items.
7. This data is tested against its associated performance baseline threshold values. The results of this comparison are written to the blackboard. If the values exceed the threshold, an action trigger is generated. If values do not exceed the threshold, the process ends and the next analysis and repair process is invoked (7), which would be the Invalid Sounds subtest process in this case.
8. If an action trigger was generated, the user configuration determines whether the trigger invokes the associated System Management process (8).
9. The System Management process is only invoked if the user has enabled the repair (9). The results of this comparison are written to the blackboard. If invoked, the defect found during the analysis is repaired. If the user did not enable the repair, the process ends and the next analysis and repair process is invoked (9).
10. The action trigger invokes the associated System Management process (10). Data about the outcome of this repair process is written to the blackboard.
11. The System Management process resolves the invalid font defect in Windows® itself (11). This updates Windows® and will affect the results of subsequent subtests. Once the repair process ends, the next analysis and repair process is invoked (9). In this example, the Invalid Sounds subtest process is invoked.

The test continues until Windows® leaves the idle state or all of the subtests within the main test has run in which case the next main test would be invoked.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW±, microdrive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, and the display, storage, or communication of results according to the processes of the present invention.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A method for monitoring computer performance comprising:
    reading a subset of computer system variables that indicate a status and/or state of a first performance condition;
    analyzing the subset of computer system variables;
    storing a result of the analysis of the subset of computer system variables in a memory, wherein the result of the analysis can be shared with other processes; and
    comparing the result of the analysis against at least one pre-determined baseline optimal threshold;
    wherein if the comparing shows that a current performance is greater than the at least one pre-determined threshold, a next system analysis process is invoked; otherwise if the comparing shows that the performance is less than the at least one pre-determined threshold, an action trigger is generated.

2. The method of claim 1, wherein the action trigger is filtered against a user configuration setting.

3. The method of claim 2, wherein if the action trigger matches a current user configuration setting, a repair and/or optimization process is invoked.

4. The method of claim 3, wherein if the action trigger does not match a current user configuration setting, a next system analysis process is invoked.

5. The method of claim 4, wherein the method executes when an operating system is in an idle state.

6. The method of claim 5, wherein if the operating system exits the idle state, the method is terminated.

7. The method of claim 6, wherein the steps of reading, analyzing, storing and comparing are continually repeated during operating system idle states for each desired performance condition.

8. A method for maintaining computer performance comprising:
    while a computer operating system is in an idle state, executing a maintenance process for:
        reading a subset of computer system variables that indicate a status and/or state of a first performance condition;
        analyzing the subset of computer system variables;
        storing a result of the analysis of the subset of computer system variables in a memory, wherein the result of the analysis can be shared with other processes; and
        comparing the result of the analysis against at least one pre-determined baseline optimal threshold;
        wherein if the comparing shows that a current performance is greater than the at least one pre-determined threshold, a next system analysis process is invoked; otherwise if the comparing shows that the performance is less than the at least one pre-determined threshold, a corrective repair and/or optimization process is invoked; and
    exiting the maintenance process or a corrective repair process when the operating system is no longer in an idle state.

9. A system for monitoring computer performance and repairing system defects, the system comprising:
    a processing unit; and
    a memory storing a program of instructions;
    wherein the program of instructions implements a method for monitoring computer performance and repairing defects, the program of instructions including instructions for performing the steps of:
    detecting an idle state of an operating system;
    when an idle state is detected, performing the steps of:
        reading a subset of computer system variables that indicate a status and/or state of a first performance condition;
        analyzing the subset of computer system variables;
        storing a result of the analysis of the subset of computer system variables in a memory, wherein the result of the analysis can be shared with other processes; and
        comparing the result of the analysis against at least one pre-determined baseline optimal threshold;
        wherein if the comparing shows that a current performance is greater than the at least one pre-determined threshold, a next system analysis process is invoked; otherwise if the comparing shows that the performance is less than the at least one pre-determined threshold, a corrective repair and/or optimization process is invoked; and
    exiting the program of instructions for monitoring and/or repairing when the operating system is no longer in an idle state.

10. A computer readable medium including computer program code for monitoring computer performance, said computer readable medium comprising:

computer program code for reading a subset of computer system variables that indicate a status and/or state of a first performance condition;

computer program code for analyzing the subset of computer system variables;

computer program code for storing a result of the analysis of the subset of computer system variables in a memory, wherein the result of the analysis can be shared with other processes; and computer program code for comparing the result of the analysis against at least one pre-determined baseline optimal threshold;

wherein if the comparing shows that a current performance is greater than the at least one pre-determined threshold, computer program code for a next system analysis process is executed;

otherwise if the comparing shows that the performance is less than the at least one pre-determined threshold, computer program code for generating an action trigger is executed.

11. The computer readable medium of claim 10, further comprising computer program code for filtering the action trigger against a user configuration setting.

12. The computer readable medium of claim 11, further comprising computer code for executing a repair and/or optimization process if the action trigger matches a current user configuration setting.

13. The computer readable medium of claim 12, further comprising computer code for executing a next system analysis process if the action trigger does not match a current user configuration setting.

14. The computer readable medium of claim 13, further comprising computer code for detecting when an operating system is in an idle state.

15. The computer readable medium of claim 14, further comprising computer code for terminating the computer program code for monitoring computer performance if the operating system exits the idle state.

16. The computer readable medium of claim 15, further comprising computer code for repeating the steps of reading, analyzing, storing and comparing for each desired performance condition in a computer system, when an operating system idle state is detected.

17. A computer readable medium including computer program code for monitoring computer performance, said computer readable medium comprising:

computer code for detecting a computer operating system idle state, and executing a maintenance process, the computer code for executing a maintenance process further comprising:

computer code for reading a subset of computer system variables that indicate a status and/or state of a first performance condition;

computer code for analyzing the subset of computer system variables;

computer code for storing a result of the analysis of the subset of computer system variables in a memory, wherein the result of the analysis can be shared with other processes; and computer code for comparing the result of the analysis against at least one pre-determined baseline optimal threshold, wherein if the comparing shows that a current performance is greater than the at least one pre-determined threshold, a next system analysis process is invoked; otherwise if the comparing shows that the performance is less than the at least one pre-determined threshold, a corrective repair and/or optimization process is invoked; and computer code for exiting the maintenance process or a corrective repair process when the operating system is no longer in an idle state.

18. A method for monitoring computer performance comprising:

reading a subset of computer operating system variables that indicate a status and/or state of a first performance condition;

analyzing the subset of computer operating system variables;

storing a result of the analysis of the subset of computer operating system variables in a memory, wherein the result of the analysis can be shared with other processes; and comparing the result of the analysis against at least one pre-determined baseline optimal threshold;

wherein if the comparing shows that a current performance is greater than the at least one pre-determined threshold, a next system analysis process is invoked; otherwise if the comparing shows that the performance is less than the at least one pre-determined threshold, an action trigger is generated.

19. The method of claim 18, wherein the action trigger is filtered against a user configuration setting.

20. The method of claim 19, wherein if the action trigger matches a current user configuration setting, a repair and/or optimization process is invoked.

21. The method of claim 20, wherein if the action trigger does not match a current user configuration setting, a next system analysis process is invoked.

22. The method of claim 21, wherein the method executes when an operating system is in an idle state.

23. The method of claim 22, wherein if the operating system exits the idle state, the method is terminated.

24. The method of claim 23, wherein the steps of reading, analyzing, storing and comparing are continually repeated during operating system idle states for each desired performance condition.

* * * * *